April 28, 1925.

A. E. YODER

HOOK

Filed April 14, 1924

Allen E. Yoder
INVENTOR

Patented Apr. 28, 1925.

1,535,279

UNITED STATES PATENT OFFICE.

ALLEN E. YODER, OF MOUNT CARMEL, PENNSYLVANIA.

HOOK.

Application filed April 14, 1924. Serial No. 706,401.

*To all whom it may concern:*

Be it known that I, ALLEN E. YODER, a citizen of the United States, residing at Mount Carmel, in the county of Northumberland and State of Pennsylvania, have invented new and useful Improvements in Hooks, of which the following is a specification.

This invention relates to hooks, particularly designed for use in connecting the ends of chains, connecting links or for analogous use, and an object of the invention is to provide a hook which is simple in construction, and one which will not become disconnected irrespective of the manner in which the various members or links are turned or twisted, and also to provide a hook structure which is designed so that it will not rust, corrode or freeze in such manner as to prevent disconnection of the hook with its co-operating element when desired.

Another object of the invention is to provide a hook as specified, which is simple in construction, may be manufactured at a relatively low cost, and one which is efficient in operation, and easy to connect or disconnect.

Other objects of the invention will appear in the following detail description, and in the accompanying drawings wherein.

Figure 1:
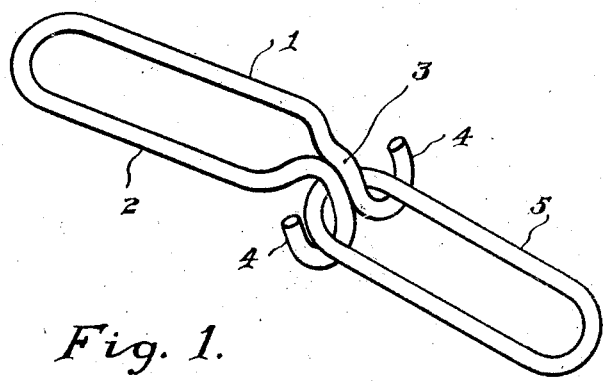
Figure 1 is a perspective view of the improved hook, showing a link connected thereto.
Figure 2:
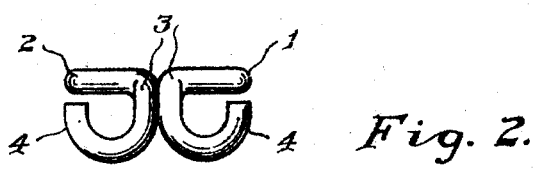
Figure 2 is an end elevation of the hook.
Figure 3:
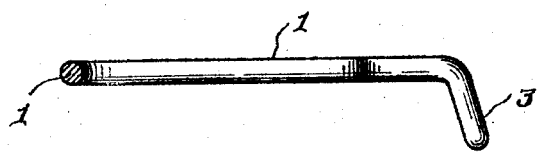
Figure 3 is a top plan of the hook.

Referring more particularly to the drawings, the improved hook which is formed of a single length of wire or analogous material, and is bent to provide a substantially link-like or analogous body 2. However, the ends of the length of material of which the body is formed, extend in parallel relation for a relatively short distance, at the longitudinal center of the body 2, and they are turned transversely to the body 2, as shown at 3, in Figure 1 of the drawings. The terminals of the length of material is then upturned to provide oppositely disposed loops 4, which open upwardly and are disposed one at each side of the longitudinal center of the body 1. The downturned portion 3 incline outwardly from the body 2, at an angle slightly greater than a right angle, so as to facilitate the connection of the hook with a link or similar co-operating article, as shown at 5. To disconnect the link 5 from the hook 1, the link is turned at an acute angle to the longitudinal axis of the hook, so that one of the upstanding loops will be enclosed within the link and then by a slight downward and outward movement of the link over the other upstanding loop, the link and hook may be easily and quickly disconnected. Connection is made by reverse movement.

From the foregoing description taken in connection with the accompanying drawings, it will be apparent that an efficient, practical connecting hook, has been provided which is designed so that corrosion or rusting thereof will not lock the connected parts in such manner as to prevent disconnection and also that the improved hook may be manufactured at a very low cost.

It is, of course, to be understood, that the invention may be constructed in various other manners and the parts associated in different relations, and therefore, I do not desire to be limited in any manner, except as set forth in the claim hereunto appended.

What I claim is:

As a new article of manufacture, a hook formed of a single length of material shaped to form a body, said length of material being bent at one end of the body to provide parallel engaging portions and the terminals of the length of material outwardly of said parallel portions being shaped to provide oppositely extending loops opening out in the same direction, said loops extending transversely of the body.

In testimony whereof I affix my signature.

ALLEN E. YODER.